US010117161B2

(12) United States Patent
Qi et al.

(10) Patent No.: US 10,117,161 B2
(45) Date of Patent: Oct. 30, 2018

(54) STATION (STA) AND METHOD FOR RANGING IN NEIGHBORHOOD AWARENESS NETWORK (NAN) COMMUNICATION

(71) Applicant: Intel IP Corporation, Santa Clara, CA (US)

(72) Inventors: Emily H. Qi, Portland, OR (US); Jonathan Segev, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 179 days.

(21) Appl. No.: 15/168,871

(22) Filed: May 31, 2016

(65) Prior Publication Data

US 2017/0215131 A1    Jul. 27, 2017

Related U.S. Application Data

(60) Provisional application No. 62/286,851, filed on Jan. 25, 2016.

(51) Int. Cl.
*H04W 4/00* (2018.01)
*H04W 48/16* (2009.01)
*H04W 76/02* (2009.01)
*H04W 76/10* (2018.01)
*H04W 84/12* (2009.01)

(52) U.S. Cl.
CPC ........... *H04W 48/16* (2013.01); *H04W 76/02* (2013.01); *H04W 76/10* (2018.02); *H04W 84/12* (2013.01)

(58) Field of Classification Search
CPC ...... H04W 48/16; H04W 76/02; H04W 84/12

USPC ......................................................... 370/338
See application file for complete search history.

(56) References Cited

U.S. PATENT DOCUMENTS

| 2010/0046492 | A1* | 2/2010 | Abraham | H04W 56/00 370/342 |
|---|---|---|---|---|
| 2014/0112194 | A1 | 4/2014 | Novlan et al. | |
| 2015/0245335 | A1 | 8/2015 | Zhou et al. | |

(Continued)

FOREIGN PATENT DOCUMENTS

WO    WO-2017131849 A1    8/2017

OTHER PUBLICATIONS

"International Application Serial No. PCT/US2016/063983, International Search Report dated Mar. 9, 2017", 3 pgs.

(Continued)

*Primary Examiner* — Mang Yeung
(74) *Attorney, Agent, or Firm* — Schwegman Lundberg & Woessner, P.A.

(57) ABSTRACT

Embodiments of a station (STA) and method for ranging in accordance with Neighborhood Awareness Network (NAN) communication are generally described herein. An initiator STA may determine, for a data service that is to be established between the initiator STA and a responder STA on a NAN data link, whether a ranging procedure is to be performed for the data service. As part of the ranging procedure, range measurements or fine timing may be determined. When the ranging procedure is to be performed for the data service, ranging configuration parameters may be included in data request messages, publish messages and other messages sent by the STAs 103. In some cases, the STAs 103 may refrain from exchanging separate messages for communication of ranging information.

30 Claims, 8 Drawing Sheets

(56) References Cited

U.S. PATENT DOCUMENTS

| | | | |
|---|---|---|---|
| 2015/0350866 A1 | 12/2015 | Patil et al. | |
| 2015/0351018 A1 | 12/2015 | Kim et al. | |
| 2015/0351151 A1* | 12/2015 | Huang | H04W 36/0083 370/252 |
| 2016/0014805 A1* | 1/2016 | Merlin | H04W 56/0005 370/345 |
| 2016/0309472 A1* | 10/2016 | Yong | H04W 72/0446 |
| 2016/0366578 A1* | 12/2016 | Abraham | H04W 8/005 |

OTHER PUBLICATIONS

"International Application Serial No. PCT/US2016/063983, Written Opinion dated Mar. 9, 2017", 5 pgs.
"Wi-Fi NAN Technical Specification", v1-0-r09—Ranging Update r05, (Apr. 20, 2016), 1-35.
"Wi-Fi NeighborAwareness Networking (NAN) Technical Specification", Version 1.0 r07, (Jan. 18, 2016), 1-156.
Camps-Mur, Daniel, et al., "Enabling alwayson service discovery: Wifi neighbor awareness networking", IEEE Wireless Communications(vol. 22, Issue:2), (Apr. 29, 2015), 118-125 pgs.

* cited by examiner

STATION (STA) AND METHOD FOR RANGING IN NEIGHBORHOOD AWARENESS NETWORK (NAN) COMMUNICATION

PRIORITY CLAIM

This application claims priority under 35 U.S.C. 119(e) to U.S. Provisional Patent Application Ser. No. 62/286,851, filed Jan. 25, 2016 which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to direct communication between mobile devices, including communication using Wi-Fi Aware techniques and/or Neighborhood Awareness Network (NAN) techniques. Some embodiments relate to ranging operations.

BACKGROUND

Mobile devices may communicate with a base station of a mobile network to exchange data, voice and other information. In some cases, it may be beneficial for a mobile device to communicate directly with other mobile devices. For instance, two mobile devices located in close proximity may communicate over a direct wireless link between the two devices. Such communication in device-to-device scenarios and other scenarios may be challenging, in some cases, and therefore there is a general need for methods and systems that address these scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
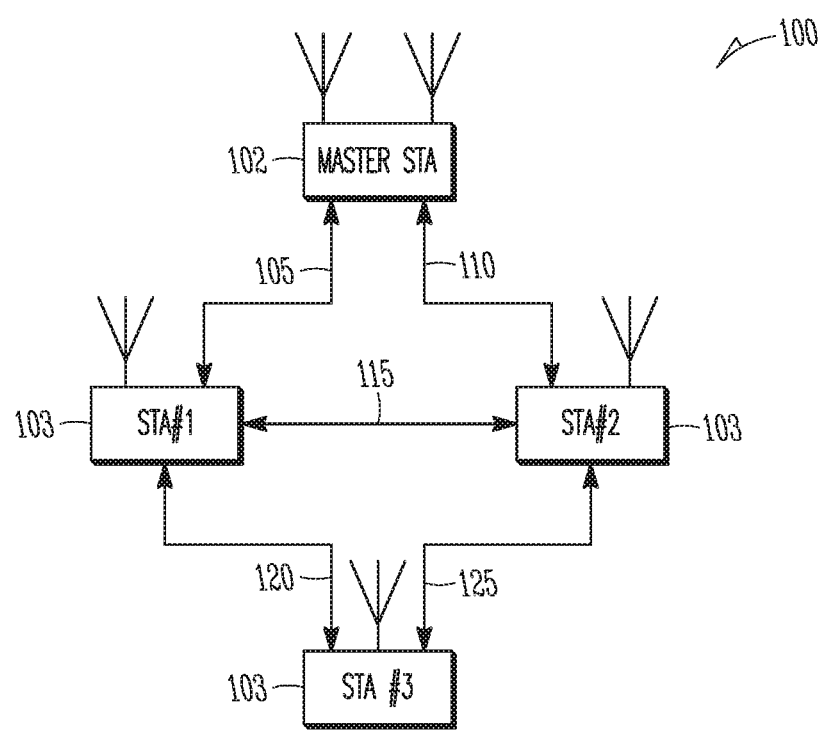
FIG. 1 illustrates a wireless network in accordance with some embodiments.

FIG. 1 illustrates a wireless network in accordance with some embodiments. In some embodiments, the network 100 may be a Wireless Local Area Network (WLAN) or a Wi-Fi network, although the scope of embodiments is not limited in this respect. It should be noted that embodiments are not limited to the number or type of components shown in the example network 100. Embodiments are also not limited by the example network 100 in terms of the arrangement of the components or the connectivity between components as shown. In addition, some embodiments may include additional components.

The example network 100 may include one or more master stations (STAs) 102 and/or one or more stations (STAs) 103. In some embodiments, the master STAs 102 and/or STAs 103 may be arranged to operate in accordance with one or more IEEE 802.11 standards. It should be noted that some embodiments may not necessarily include a master STA 102. In addition, in some embodiments, an STA 103 may be configurable to operate as a master STA 102 and/or as an STA 103. These embodiments are not limiting, however, as other mobile devices, portable devices and/or other devices, which may or may not be arranged to operate in accordance with a standard, may be used in some embodiments. As an example, a User Equipment (UE) arranged to operate in accordance with one or more Third Generation Partnership Project (3GPP) standards may be used in some cases.

In the example network 100, the STAs 103 may be configured to communicate with the master STA 102 and/or with other STAs 103. As shown in FIG. 1, STA #1 may communicate with the master STA 102 over the wireless link 105, STA #2 may communicate with the master STA 102 over the wireless link 110, and STA #1 and STA #2 may communicate directly with each other over the wireless link 115. In some embodiments, the communication between the master STA 102 and the STAs 103 and/or the communication between the STAs 103 may be performed using any suitable 802.11 standard (including legacy 802.11 standards). Such communication may also be performed in accordance with one or more Wi-Fi Aware and/or Neighborhood Awareness Network (NAN) standards, in some embodiments. These embodiments are not limiting, however, as other communication techniques and/or protocols may be used for the communication between the master STA 102 and the STAs 103 and/or the communication between the STAs 103, in some embodiments.

In accordance with some embodiments, STA #1 may transmit data packets to STA #2 as part of a data service. In some cases, a ranging operation may be used by STAs #1 and #2 to determine a range between the STAs for usage as part of the data service. As an example, STA #1 and STA #2 may communicate over a NAN Data Link (NDL) between STA #1 and STA #2. These embodiments will be described in more detail below.

As a non-limiting example, two STAs 103 may communicate with each other although both may not necessarily communicate with the same master STA 102. For instance, one of the STAs 103 may be out of range of the master STA 102, and in some cases, may communicate with a different master STA 102. Referring to FIG. 1, STA #3 may communicate with STAs #1 and #2 over wireless links 120 and 125, despite being out of range of the master STA 102 (at least temporarily).

In some embodiments, the master STA 102 may perform one or more operations as part of a NAN communication, such as exchanging of control messages with the STAs 103 for an establishment of the NAN communication, providing a reference timing for the NAN communication and/or other management/control operations. However, embodiments are not limited to usage of a master STA 102 in the NAN communication, as NAN communication between STAs 103 may be performed with little or no involvement of the master STA 102. For instance, one of the STAs 103 may transmit synchronization signals to enable other STAs 103 to establish a common synchronization/timing, in some embodiments.

In some embodiments, the STAs 103 may be arranged to operate in accordance with a protocol and/or standard such as Wi-Fi Aware, NAN, Wi-Fi Aware 2.0, NAN2 and/or others to enable the STAs 103 to discover other STAs 103, devices and/or services that may be operating in a relatively close proximity. As an example, multiple STAs 103 may form a NAN data cluster (NDC) and may be synchronized to a same clock and/or a same reference timing. The STAs 103 may converge on a time period and channel included as part of a discovery window (DW) to facilitate the discovery of services of other STAs 103 and/or other devices. The discovery may be performed, in some cases, with little or no involvement from an access point (AP) or other infrastructure components, although embodiments are not limited as such. In some embodiments, one or more signals transmitted by an AP may be used by one or more STAs 103 to determine a reference timing and/or a schedule for a NAN communication. In some embodiments, one or more STAs 103 may exchange one or more control messages with an AP to at least partly enable a NAN communication. For instance, the NAN communication may be established based at least partly on a control message received from an AP, in some embodiments.

In accordance with some embodiments, the STAs 103 and/or master STA 102 may be arranged to contend for a wireless medium (e.g., during a contention period) to receive exclusive control of the medium for a transmission period. For instance, the transmission period may include a transmission opportunity (TXOP), which may be included in an 802.11 standard and/or other standard. The data transmissions may be performed in accordance with any suitable multiple-access techniques and/or multiplexing techniques. Accordingly, one or more of orthogonal frequency division multiple access (OFDMA), orthogonal frequency division multiplexing (OFDM), code-division multiple access (CDMA), time-division multiple access (TDMA), frequency division multiplexing (FDMA), space-division multiple access (SDMA), multiple-input multiple-output (MIMO), multi-user (MU) multiple-input multiple-output (MIMO) (MU-MIMO) and/or other techniques may be employed in some embodiments.

In some embodiments, the STA 103 may communicate with other STAs 103 and/or the master STA 102 in accordance with legacy IEEE 802.11 communication techniques. These embodiments are not limiting, however, as non-legacy IEEE 802.11 techniques or a combination of legacy and non-legacy IEEE 802.11 techniques may be used in some embodiments.

In some embodiments, channels used for communication between STAs 103 and/or master STAs 102 may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel may be configured for transmitting a number of spatial streams, in some embodiments. These embodiments are not limiting, however, as other suitable bandwidths may be used in some embodiments.

In some embodiments, high-efficiency wireless (HEW) techniques may be used, although the scope of embodiments is not limited in this respect. As an example, techniques included in 802.11ax standards and/or other standards may be used. In such embodiments, an HEW packet may be generated in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
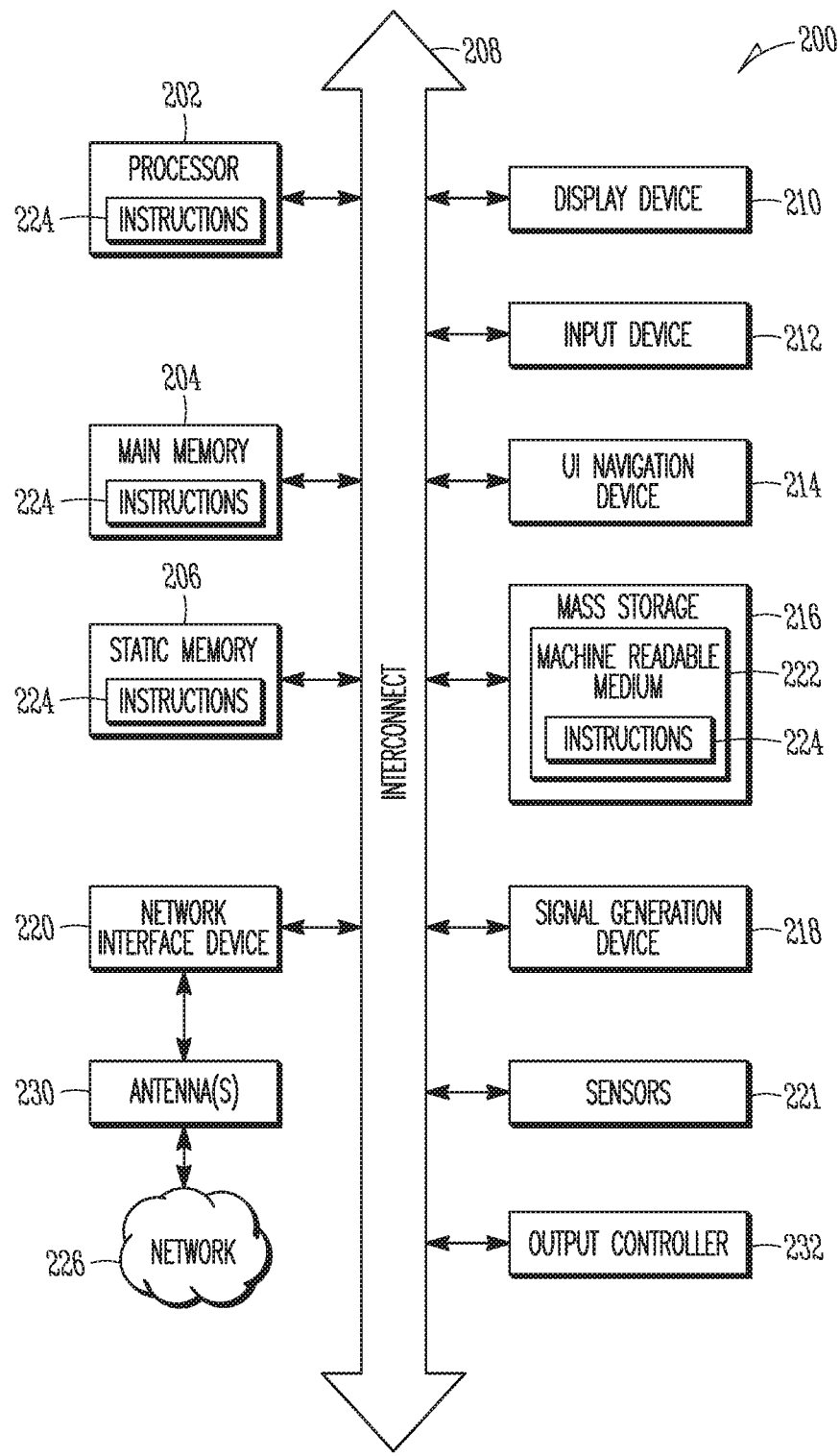
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a master STA 102, STA 103, access point (AP), UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
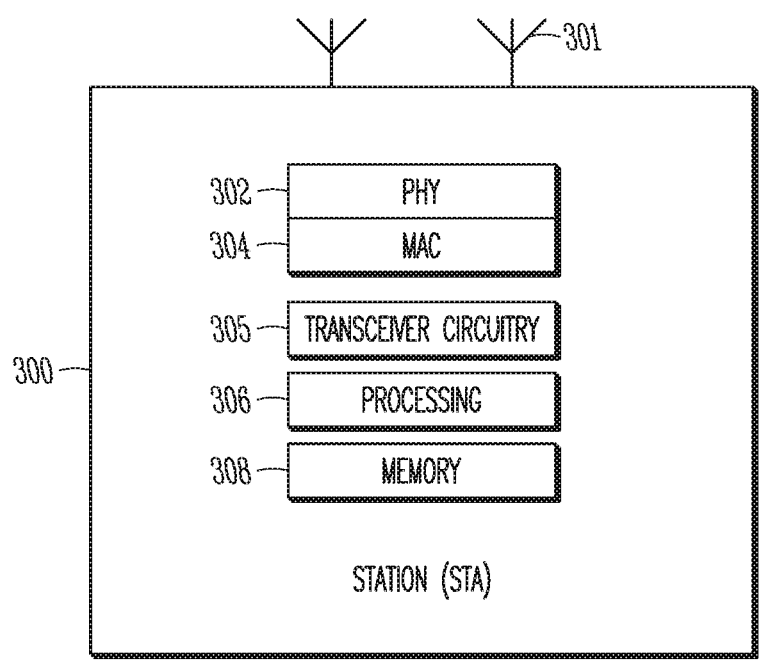
FIG. 3 illustrates a station (STA) in accordance with some embodiments.

FIG. 3 illustrates a user station (STA) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. The STA 300 may be suitable for use as a master STA 102 as depicted in FIG. 1, in some embodiments. Accordingly, references to an STA 300 are not limiting, and may be applicable to a master STA in some cases.

The STA 300 may include physical layer circuitry 302 and a transceiver 305, one or both of which may enable transmission and reception of signals to and from components such as the master STA 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The antennas 301, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 230 may be effectively separated to take advantage of spatial diversity and the different channel characteristics that may result.

In some embodiments, the STA 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 or other device may include one or more of a keyboard, a display, a non-volatile memory port, multiple antennas, a graphics processor, an application processor, speakers, and other mobile device elements. The display may be an LCD screen including a touch screen.

Although the STA 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA.

In some embodiments, the STA 300 may communicate using OFDM communication signals over a multicarrier communication channel. Accordingly, in some cases the STA 300 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the STA 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, channel resources may be used for transmissions of signals between STAs 103. Although embodiments are not limited as such, the transmissions may be performed in accordance with contention based techniques and/or time-division duplex (TDD) techniques in some cases. In some embodiments, the channel resources may include multiple channels, such as the 20 MHz channels previously described. The channels may include multiple sub-channels or may be divided into multiple sub-channels to accommodate multiple access for multiple STAs 103, in some cases. In some embodiments, the sub-channels may comprise a predetermined bandwidth. As a non-limiting example, the sub-channels may each span 2.03125 MHz, the channel may span 20 MHz, and the channel may include eight or nine sub-channels. However, any suitable frequency span for the channels and/or sub-channels may be used. In some embodiments, the frequency span for the sub-channel may be based on a value included in an 802.11 standard (such as 802.11ax), a 3GPP standard or other standard. In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

In accordance with some embodiments, as part of a Neighborhood Awareness Network (NAN) communication, an initiator STA 103 may determine, for a data service that is to be established between the initiator STA 103 and a responder STA 103 on a NAN data link, whether a ranging procedure is to be performed for the data service. As part of the ranging procedure, range measurements or fine timing may be determined. When the ranging procedure is to be performed for the data service, ranging configuration parameters may be included in data request messages, publish messages and other messages sent by the STAs 103. In some cases, the STAs 103 may refrain from exchanging separate messages for communication of ranging information. In some cases, the STAs 103 may exchange separate messages for communication of data request information and ranging information. These embodiments will be described in more detail below.

Figure 4:
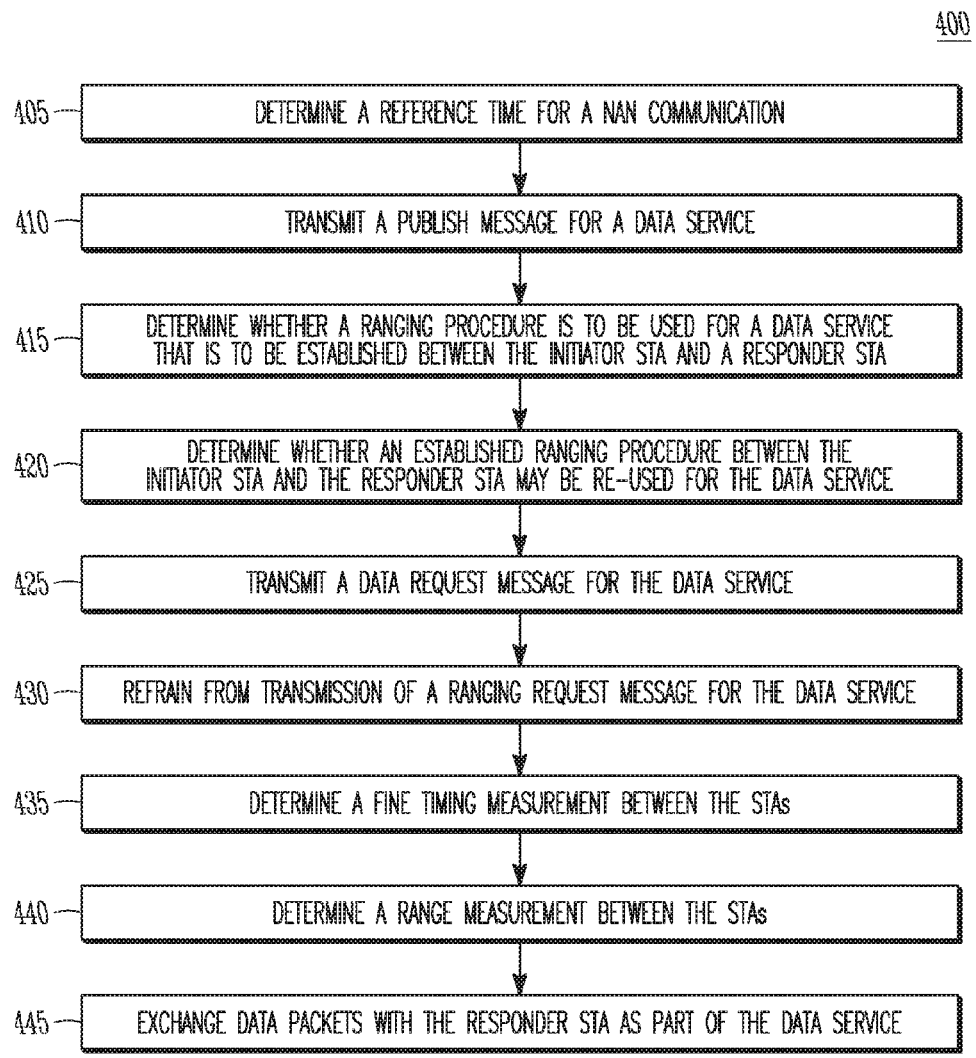
FIG. 4 illustrates the operation of a method of communication in accordance with some embodiments.

FIG. 4 illustrates the operation of a method of determination of channel resources in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 6, although it is understood that the method 400 may be practiced with any other suitable systems, interfaces and components.

In addition, while the method 400 and other methods described herein may refer to STAs 103 and/or master STAs 102 operating in accordance with 802.11 or other standards, embodiments of those methods are not limited to just those devices and may also be practiced on other mobile devices, such as an HEW STA, an Evolved Node-B (eNB) or User Equipment (UE). The method 400 and other methods described herein may also be practiced by wireless devices configured to operate in other suitable types of wireless communication systems, including systems configured to operate according to various Third Generation Partnership Project (3GPP) Long Term Evolution (LTE) standards. The method 400 may also be applicable to an apparatus for an STA 103 and/or master STA 102 or other device described above, in some embodiments.

It should also be pointed out that reference may be made herein to an "initiator STA 103" and/or "responder STA 103." For instance, an operation may include transmission of a signal from an initiator STA 103 to a responder STA 103. These references are not limiting, however. In some embodiments, an STA 103 may be configured to perform operations described herein for either an initiator STA 103, a responder STA 103 or both.

In some embodiments, a NAN communication between STAs 103 and/or a master STA 102 may be performed in one or more channels. The channels may or may not be adjacent in frequency, and may span any suitable bandwidth including but not limited to the values described previously. As a non-limiting example, a group of 20 MHz channels may be used.

In some embodiments, the NAN communication may include a NAN Data Link (NDL) communication in which STAs 103 may communicate with each over an NDL. In some cases, the NDL may be or may include a direct wireless link between the STAs 103. It should be noted that embodiments are not limited to NDL communication, however, as other types of communication may be used. For instance, in some embodiments, NAN communication may include a NAN Data Cluster (NDC) communication, in which STAs 103 in an NDC may communicate with each other.

The NAN communication may be performed over direct wireless link(s) between the initiator STA 103 and the responder STA(s) 103 and in accordance with an NAN protocol, in some embodiments. Accordingly, contention based access may be used for data transmissions and/or transmission of control messages. In some embodiments, the usage of an idle period detection, a CW, a back-off count, transmission delay and/or other concepts for contention based access may be performed in accordance with a carrier sense multiple access with collision avoidance (CSMA/CA) protocol. As an example, the CSMA/CA protocol may be included in an 802.11 standard and/or other standard, in some cases, although embodiments are not limited to usage of CSMA/CA techniques that are included in a standard.

In some embodiments, a NAN communication may be based on time blocks. In some cases, one or more STAs 103 and/or devices may be synchronized for such a communication. For instance, a starting time of one or more time blocks in a pattern or sequence may be based on a reference timing determined by each of the STAs 103. In some cases, it is possible that multiple devices may start access in the same time block and may transmit packets. Hence, some contention mitigation scheme may be used for different types of time blocks, including but not limited to, FAW, NDC, and NDL time blocks. An FAW time block may be announced by a particular STA 103 to enable other STAs 103 to contact the particular STA 103 to establish a data link. An NDC base schedule may include one or more NDC time blocks agreed to by all devices in the same NDC. An NDL schedule may include one or more NDL time blocks to which two STAs 103 have agreed for NAN data transmission. In some cases, a same time block may be used by multiple devices for NAN communication.

It should also be noted that embodiments are not limited by references herein to transmission, reception and/or exchanging of frames and messages. In some embodiments, such a frame or message may be generated by processing circuitry (such as by a baseband processor included in the processing circuitry) for transmission. The transmission may be performed by a transceiver or other component, in some cases. In some embodiments, such a frame or message may be decoded, detected and/or processed by the processing circuitry (such as by the baseband processor). The frame or message may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 405 of the method 400, the initiator STA 103 may determine a reference timing to be used for Neighborhood Awareness Network (NAN) communication with one or more other STAs 103. Accordingly, the reference timing may be used by the STAs 103 to synchronize NAN communication. For instance, a starting time (or other time) of a particular time block, such as a discovery window (DW), further availability window (FAW), NDL time block, NDC time block and/or other time block may be based on the reference timing. Transmission and/or reception of messages and/or signals may be performed in accordance with such a reference timing, in some embodiments.

In some embodiments, the reference timing may be determined based on a reception of one or more synchronization signals and/or other signals from a master STA 102. Accordingly, multiple STAs 103 may receive those signals and/or other signals from the master STA 102, and the STAs 103 may synchronize for the NAN communication. These embodiments are not limiting, however, as other techniques may be used. For instance, a particular STA 103 may transmit one or more synchronization signals, beacon signals and/or other signals, and other STAs 103 may synchronize to a reference timing that the particular STA 103 wishes to establish. In some embodiments, the STAs 103 may synchronize to a common timing and/or schedule by exchanging signals with each other. For instance, the initiator STA 103 may determine the reference timing based at least partly on a reception of a synchronization signal from another STA 103. In some cases, the signals may be exchanged at least partly to enable synchronization, although embodiments are not limited as such. In some embodiments, the signals may not necessarily have been transmitted for purposes of enabling the synchronization.

It should also be pointed out that in some embodiments, the STAs 103 may exchange one or more control signals with the master STA 102 as part of the establishment of the NAN communication. For instance, control information for the NAN communication may be received from the master STA 102, such as which channels are available and/or unavailable for the NAN communication. Embodiments are not limited as such, however, as STAs 103 may exchange and/or broadcast such control signals in some embodiments. For instance, in some cases, a master STA 102 may not be used.

At operation 410, the initiator STA 103 may transmit a publish message for a data service that may indicate that the initiator STA 103 supports the data service. As previously described, the publish message may be generated by the initiator STA 103 for transmission, in some embodiments. In some embodiments, the publish message may be transmitted as a broadcast message, although embodiments are not limited as such. For instance, the initiator STA 103 may transmit the publish message as a broadcast message to indicate to other STAs 103 that the data service is supported by the initiator STA 103.

In some embodiments, the publish message may include information related to ranging (such as a group of one or more ranging configuration parameters (RCP), a flag to indicate that ranging is to be used and/or other information) when the data service is to be used in accordance with a ranging procedure. The group of RCPs may be included for data services that utilize ranging information, examples of which will be given below. Accordingly, when it is determined by the initiator STA 103 that ranging is to be performed for the data service, the publish message may include the group of RCPs. In addition, when it is determined by the initiator STA 103 that ranging is not to be performed for the data service, the publish message may exclude the group of RCPs.

As an example of an RCP, a ranging resolution may indicate an accuracy required for the ranging operation. As another example of an RCP, a ranging interval may indicate a maximum time difference between range measurements, such as a limit on how much time may elapse between measurements. As another example of an RCP, thresholds related to geo-fencing, such as an inner geo-fence threshold and an outer geo-fence threshold, may indicate distance thresholds that may be applied to a distance between STAs 103. As another example of an RCP, a ranging indication condition may indicate to the responder STA 103 how often and/or under which conditions a ranging result is to be reported. For instance, the ranging indication condition may indicate that a continuous (such as at regular intervals) reporting is to be performed. The ranging indication condition may also indicate that the responder STA 103 is to report a ranging result when a condition related to a geo-fence is met. For instance, when the responder STA 103 moves out of range of the outer geo-fence threshold or when the responder STA 103 moves into the range of the inner geo-fence threshold. These examples are not limiting, however, as any or all of these RCPs and/or others may be used, in some embodiments.

In some embodiments, a message (such as the publish message, data request message (to be described below) and/or other message) may include information about the data service. Examples of such information may include a publish ID, responder NAN address, Quality of Service (QoS) requirements and/or security information. Embodiments are not limited by these examples, however, as the message may include any or all of these examples and/or others, in some embodiments.

In some embodiments, the message may include information about the data service and information about the ranging procedure in a same message or in a combined message. Accordingly, the initiator STA 103 may communicate information about the ranging procedure to other STAs 103 without usage of separate ranging messages, in some cases. That is, the initiator STA 103 may refrain from transmission of separate ranging messages, in some cases, as the RCPs and/or ranging information may be included in the message (publish message, data request message and/or other message) when the data service is to perform ranging operations.

In some embodiments, the publish message may be transmitted during a discovery window (DW), although the scope of embodiments is not limited in this respect. The publish message may be included in a NAN standard, an 802.11 standard and/or other standard, in some embodiments, but embodiments are not limited to usage of messages that are included in a standard. In some embodiments, the DW may include a time block allocated on a particular channel to enable STAs 103 to discover services of each other. For instance, the discovery may be performed by the STAs 103 using direct communication between STAs 103, in which access points (APs) and/or other infrastructure components may have no involvement or limited involvement, in some cases.

Figure 5:
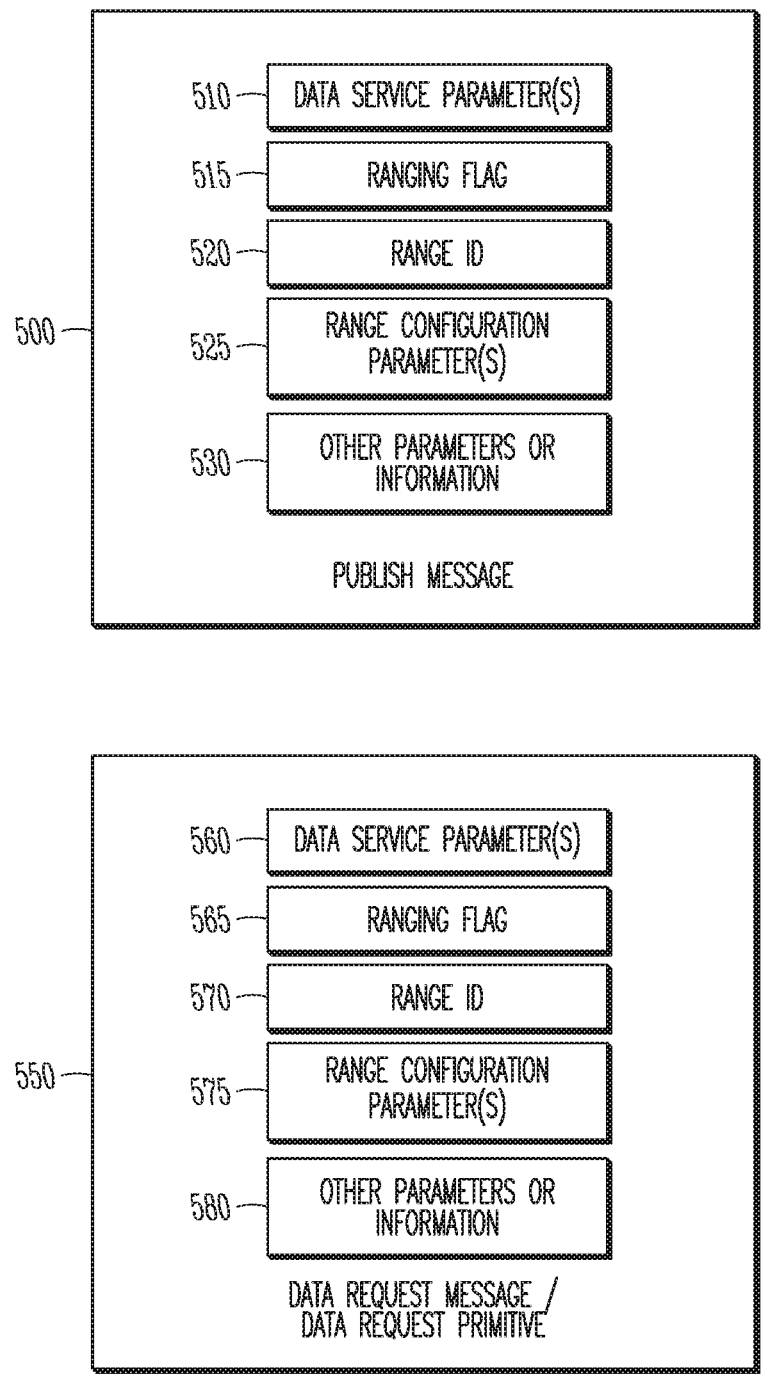
FIG. 5 illustrates examples of messages that may be used in NAN communication in accordance with some embodiments.

FIG. 5 illustrates examples of messages that may be used in NAN communication in accordance with some embodiments. It should be noted that embodiments are not limited to the arrangement and/or elements shown in the messages 500, 550. For instance, all parameters and/or information shown in FIG. 5 for the example messages 500, 550 may not necessarily be included in some embodiments. In addition, the organization of the parameters and/or information shown in the example messages 500, 550 is not limiting.

In some embodiments, the initiator STA 103 may transmit the publish message 500 or a similar message to indicate to other STAs 103 that the initiator STA 103 supports the data service. The publish message 500 may include one or more data service parameters 510 that may identify the data service and/or describe other information about the data service. The publish message 500 may also include a ranging flag 515 that may indicate whether or not ranging is to be used as part of the data service. The publish message 500 may also include a ranging ID 520 and one or more RCPs 525. The publish message 500 may also include any number (including zero) of other parameters or information 530. It should be noted that the publish message 500 may be a primitive that may be included in another message exchanged between STAs 103, in some embodiments.

Returning to the method 400, the initiator STA 103 may determine whether a ranging procedure is to be used for a data service that is to be established between the initiator STA 103 and a responder STA 103. In some embodiments, the data service may have been previously described in a publish message such as at operation 410, but the scope of embodiments is not limited in this respect. At operation 420, the initiator STA 103 may determine whether an established ranging procedure between the initiator STA 103 and the responder STA 103 may be re-used for the data service. For instance, another data service already established between the initiator STA 103 and the responder STA 103 may use the ranging operation, and it may be possible for the initiator STA 103 and the responder STA 103 to re-used the ranging operation (instead of initiating a new ranging operation). Accordingly, the initiator STA 103 and the responder STA 103 may be able to re-use a ranging operation for multiple data services, in some cases.

At operation 425, the initiator STA 103 may transmit a data request message for the data service. As previously described, the data request message may be generated by the initiator STA 103 for transmission, in some embodiments. When it is determined that the ranging procedure is to be established for the data service, the data request message may include a group of one or more ranging configuration parameters (RCPs) to be used for the ranging procedure. In some embodiments, when it is determined that the ranging procedure is not to be established for the data service, the data request message may exclude the group of RCPs.

The data request message may also include information related to the data service. Examples of such information may include a publish ID, responder NAN address, Quality of Service (QoS) requirements and/or security information. Embodiments are not limited by these examples, however, as the data request message may include any or all of these examples and/or others, in some embodiments.

At operation 430, the initiator STA 103 may refrain from transmission of separate ranging request messages for the data service. For instance, when it is determined that the ranging procedure is to be established for the data service, the initiator STA 103 may include the RCPs in the data request message and may refrain from transmission of separate ranging request messages with the RCPs.

Referring to FIG. 5, in some embodiments, the initiator STA 103 may transmit the data request message 550 or a similar message to indicate a request to the responder STA 103 that the initiator STA 103 intends to establish the data service with the responder STA 103. The data request message 550 may include one or more data service parameters 560 that may identify the data service and/or describe other information about the data service. The data request message 550 may also include a ranging flag 565 that may indicate whether or not ranging is to be used as part of the data service. The data request message 550 may also include a ranging ID 570 and one or more RCPs 575. The data request message 550 may also include any number (including zero) of other parameters or information 580. It should be noted that the data request message 550 may be a data request primitive that may be included in another message exchanged between STAs 103, in some embodiments. In addition, other messages and/or primitives related to the data service may be of a similar format, in some embodiments. Accordingly, such other messages and/or primitives may include one or more of the parameters shown in the data request message 550, in some cases.

As previously described, in some embodiments, when it is determined that the ranging operation is to be used for the data service, the data request message may include information about the data service and information about the ranging procedure in a same message or in a combined message. Accordingly, the initiator STA 103 may communicate information about the ranging procedure to other STAs 103 without usage of separate ranging messages, in some cases. That is, the initiator STA 103 may refrain from transmission of separate ranging messages, in some cases, as the RCPs and/or ranging information may be included in the data request message when the data service is to perform ranging operations. However, it should also be noted that in some cases, the STAs 103 may exchange separate messages for communication of data request information and ranging information.

As a non-limiting example, the initiator STA 103 may establish a first data service between the initiator STA 103 and a first responder STA 103 on a first NAN data link and may also establish a second data service between the initiator STA 103 and a second responder STA 103 on a second NAN data link. The first data service may include usage of a ranging procedure. A first data request message transmitted to the first responder STA 103 may include a group of one or more RCPs to be used by the initiator STA 103 and the first responder STA 103 for the ranging procedure. The second data service may exclude usage of the ranging procedure. A second data request message transmitted to the second responder STA 103 may exclude the group of RCPs. In addition, the initiator STA 103 may refrain from transmission of separate ranging request messages for the first data service as the RCPs for the ranging operation may be included in the first data request message. However, it should also be noted that in some cases, the initiator STA 103 may transmit separate messages for communication of data request information and ranging information.

It should be noted that techniques described for the publish message and/or data request message may also be used, in some cases, for other messages exchanged between the initiator STA 103 and the responder STA 103, examples of which will be given below. Accordingly, in some cases, when the ranging operation is to be used, the initiator STA 103 may include RCPs in those other messages and may refrain from sending separate ranging messages to communicate the RCPs.

At operation 435, a fine timing measurement between the STAs 103 may be determined. In some embodiments, the fine timing measurement may be based on a reception of a message (such as a ranging response message and/or other message) from the responder STA 103. As a non-limiting example, a propagation delay may be determined for a message exchanged between STAs 103, and the fine timing measurement may be determined accordingly. At operation 440, a range measurement between the STAs 103 may be determined. In some cases, the range measurement may be based at least partly on the fine timing measurement, although embodiments are not limited as such. It should be noted that the STAs 103 may determine such ranging measurements and may send them to each other, in some cases.

It should be noted that a ranging operation may be used by multiple data services, in some cases. As an example, a ranging operation may be used as part of an established first data service. It may be determined that a second data service to be established is to use a ranging operation. It may also be determined that the ranging operation used for the first data service may be re-used by the second data service. In this case, a range measurement for the second data service may be determined using the ranging operation used for the first data service.

Figure 6:
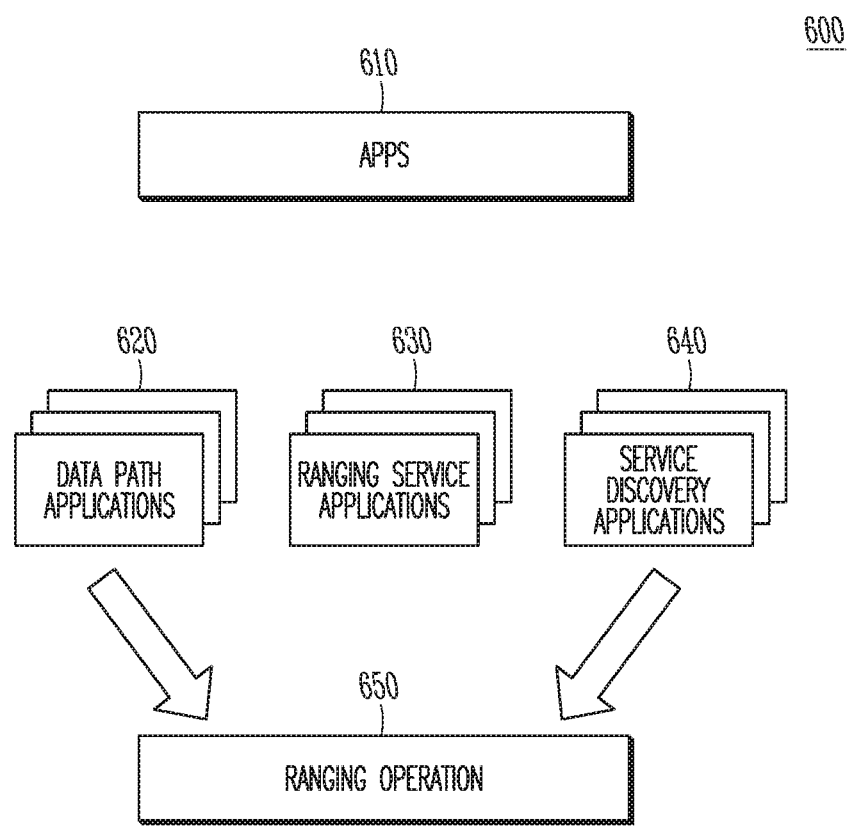
FIG. 6 illustrates an example of usage of applications in accordance with some embodiments.

FIG. 6 illustrates an example of usage of applications in accordance with some embodiments. As shown in the example scenario 600, applications 610 may use one or more data path applications 620, one or more ranging service applications 630 and/or one or more service discovery applications 640. In some cases, one or more of the applications 620, 630, 640 may use a same ranging operation 650.

At operation 445, the initiator STA 103 and the responder STA 103 may exchange data packets as part of the data service. Accordingly, the initiator STA 103 may transmit one or more data packets and/or receive one or more data packets.

In some embodiments, a traffic type of the data packets may be based on range measurements. As a non-limiting example, a first traffic type of a first data rate may be used when the responder STA 103 is within a particular distance threshold (based on range measurements) and a second traffic type of a second, lower data rate may be used when the responder STA 103 is beyond a particular distance threshold. As another non-limiting example, the traffic type of the data may be based at least partly on a comparison of a range measurement of the ranging procedure with the inner and outer geo-fence thresholds.

In an example scenario, a coffee shop may offer free music tracks to some customers. However, when the customer leaves the coffee shop, the streaming of music tracks may be stopped. In such a case, the music streaming application may set up a NAN data path and a ranging operation simultaneously. In another example scenario, a coffee shop may offer free TV shows to customers sitting at the coffee shop and may offer free music tracks to customers in the surrounding area. In such a case, the ranging operation may be used to decide which of the different data path applications. TV shows or music, are available to the different customers.

In some embodiments, an application may set up a data path and ranging operation jointly. As an example, one or more combined messages may be used to establish the data path and ranging operation. In some embodiments, a ranging operation may be used for one or more data path applications. As an example of the ranging operation, geo-fencing may be used. In some cases, control of the data path may also be supervised by a defined geo-fence without upper layer intervention. In some embodiments, ranging enabled Wi-Gig devices may be used.

In some embodiments, an architecture may support one or more ranging applications. In some cases, a data path application and/or a service discovery operation may use such ranging operations. As an example, information related to a ranging operation may be included in a data path primitive, control block and/or control message, to enable an application to set up, cancel and/or modify a data path and a ranging operation using a same time slot. For instance, the time slot may be shared by the data path functionality. In some cases, peers may identify a complete functionality needed from the medium resource allocation. Several example data primitives are described below, which may be included in a 3GPP standard and/or other standard, in some cases. It should be noted that embodiments are not limited to the examples and are also not limited to data primitives included in a standard.

As previously described, some techniques that have been described herein as applicable to a data request message and/or a publish message may be applicable to other types of messages, in some embodiments. For instance, RCPs may be included in such messages and the STAs 103 may refrain from exchanging separate ranging messages for communication of the RCPs. Accordingly, a combined message may be used to exchange information related to the data service and information related to the ranging operation, in some embodiments. Non-limiting examples are given below, but it is understood that these techniques may be applied to other messages, in some cases. In some embodiments, messages such as the example messages below may be data primitives that may be included in other messages exchanged between the STAs 103.

As an example, a data request message and/or data request primitive may be of a form such as DataRequest(publish_id, responder_nan_address, qos_requirements, security, service_specific_info, range_id, range_configuration_parameters). As another example, a data response message and/or data response primitive may be of a form such as DataResponse(status, ndp_id, initiator_data_address, qos_requirements, security, service_specific_info, range_id, range_configuration_parameters). As another example, a data end message and/or data end primitive may be of a form such as DataEnd(status, ndp_id, initiator_data_address, range_id). As another example, a data indication message and/or data indication primitive may be of a form such as DataIndication (publish_id, ndp_id, initiator_data_address, responder_data_address, security, service_specific_info, range_id, rangeconfigurationparameters). As another example, a data confirmation message and/or data confirmation primitive may be of a form such as DataConfirm(status, ndp_id, initiator_data_address, responder_data_address, service_specific_specific_info, range_id, rangeconfigurationparameters). In some cases, the range_id and/or rangeconfigurationparameters (RCP) shown in these example messages and/or primitives may be optionally included in the messages and/or primitives.

In some embodiments, when an initiator STA 103 sets up a new NDP or range service with a responder STA 103 and a range operation is also required, the initiator STA 103 may establish a ranging operation with the responder STA 103 if there is no ranging operation already established between the two STAs 103. As a non-limiting example, the "range id" parameter in the DataRequest message described earlier may be set to a value of 0 to indicate that the ranging operation is to be set up. A new range operation may be set up using range configuration parameters (RCP) in the Data Request message. In some embodiments, if two STAs have established a ranging operation to support one or more NDPs, range service or service discovery applications, and one of the STAs may initiate a new NDP/range service set up between the two STAs, the initiator STA may choose to re-use the existing range operation or may update the existing range operation schedule to accommodate the new NDP/range service. As a non-limiting example, the "range id" parameter in the Data Request message may be set to a non-zero value, which may indicate that the ranging operation is not to be established or that it is already established.

The existing ranging operation schedule may be updated using range configuration parameters (RCP) in the Data Request message.

In some embodiments, two STAs that maintain a ranging operation to support one or more data path applications, ranging service applications or service discovery applications may update the ranging operation schedule.

Figure 7:
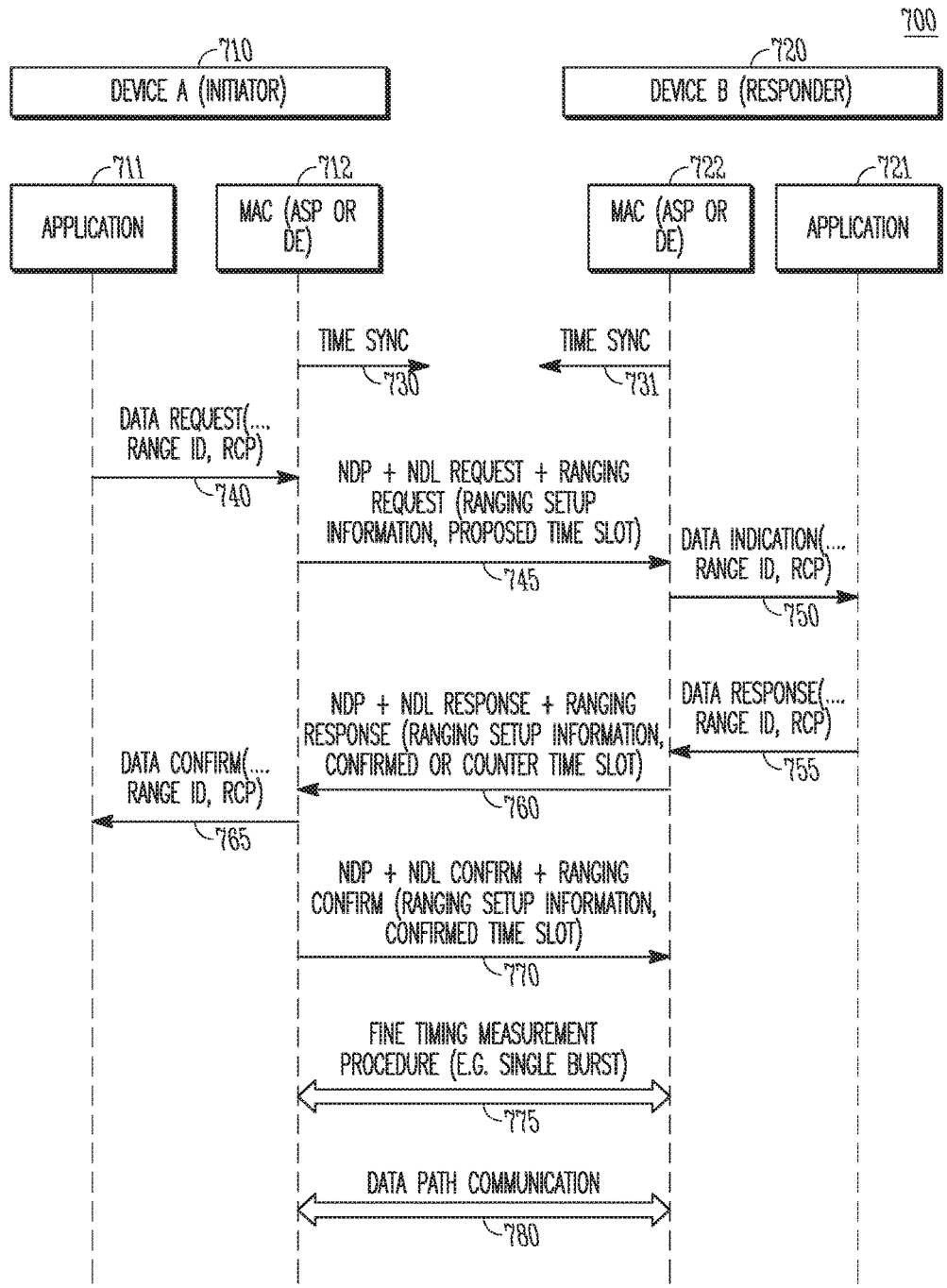
FIG. 7 illustrates the operation of another method of communication in accordance with some embodiments.

FIG. 7 illustrates the operation of another method of communication in accordance with some embodiments. As mentioned previously regarding the method 400, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6 and 8, although it is understood that the method 700 may be practiced with any other suitable systems, interfaces and components. Discussion herein of various techniques and concepts may be applicable to the method 700 in some cases, including data services, NAN data links, ranging operations, ranging procedures, range configuration parameters, range measurements, fine timing measurements, geo-fences, messages related to establishment of data services, publish messages, synchronization of NAN devices, reference timing and/or others. In addition, embodiments of the method 700 may be applicable to STAs 103, APs, UEs, eNBs or other wireless or mobile devices. The method 700 may also refer to an apparatus for an STA 103 and/or other device described above.

Referring to FIG. 7, the initiator device 710 and responder device 720 may be STAs 103 in some embodiments. The scope of embodiments is not limited in this respect, however, and other devices may be used in some embodiments. The initiator device 710 may include an application layer 711 and a MAC layer 712. The responder device 720 may include an application layer 721 and a MAC layer 722. It should be noted that embodiments are not limited to the types of messages and primitives shown in FIG. 7. Embodiments are also not limited to the parameters included in the messages and primitives of FIG. 7. In addition, embodiments are also not limited to the chronological ordering of messages and primitives shown in FIG. 7.

At operation 730, the initiator device 710 may determine time synchronization, such as a reference timing. At operation 731, the responder device 720 may determine time synchronization, such as a reference timing. At operation 740, the application layer 711 may send a data request primitive to the MAC layer 712. At operation 745, the initiator device 710 may transmit a message (such as a data request message) to the responder device 720. As an example, such a message may include the data request primitive, in some cases. As another example, the message may include one or more parameters included in the data request primitive. As another example, the message may be based on one or more parameters included in the data request primitive.

The responder device 720 may receive the data request message as part of operation 745, and the MAC layer 722 and application layer 721 may exchange one or more data primitives, including but not limited to those shown in operations 750 and/or 755. At operation 760, the responder device 720 may transmit a response message to the initiator device 710 and may receive a confirmation message from the initiator device 710 at operation 770. The MAC layer 712 and application layer 711 of the initiator device 710 may exchange data primitives such as the data confirmation primitive at operation 765.

At operation 775, the initiator device 710 and the responder device 720 may perform ranging operations such as fine timing measurements and/or others, and may exchange one or more related messages. At operation 780, one or more data packets may be exchanged between the initiator device 710 and the responder device 720.

Figure 8:
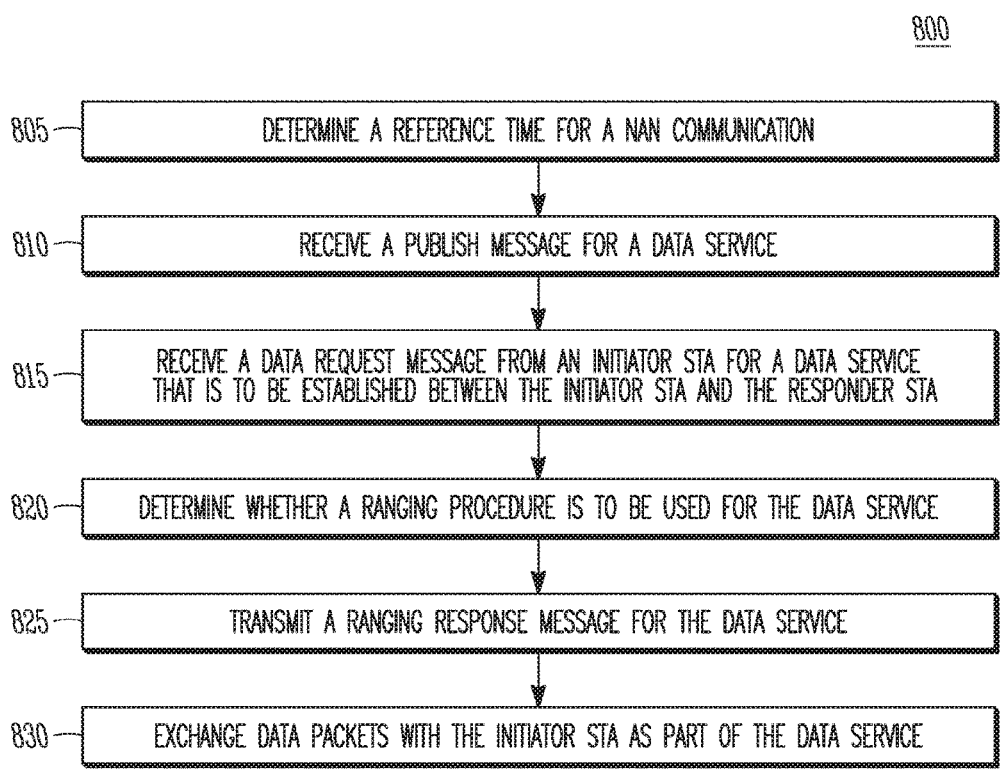
FIG. 8 illustrates the operation of another method of communication in accordance with some embodiments.

FIG. 8 illustrates the operation of another method of communication in accordance with some embodiments. As mentioned previously regarding the method 400, embodiments of the method 800 may include additional or even fewer operations or processes in comparison to what is illustrated in FIG. 8 and embodiments of the method 800 are not necessarily limited to the chronological order that is shown in FIG. 8. In describing the method 800, reference may be made to FIGS. 1-7, although it is understood that the method 800 may be practiced with any other suitable systems, interfaces and components. In addition, embodiments of the method 800 may be applicable to STAs 103, APs, UEs, eNBs or other wireless or mobile devices. The method 800 may also refer to an apparatus for an STA 103 and/or other device described above.

It should be noted that the method 800 may be practiced at a responder STA 103 and may include exchanging of signals or messages with an initiator STA 103. Similarly, the method 400 may be practiced at an initiator STA 103 and may include exchanging of signals or messages with a responder STA 103. In some cases, operations and techniques described as part of one of the methods 400 or 800 may be relevant to the other method. In addition, embodiments may include operations performed at the initiator STA 103 that may be reciprocal or similar to other operations described herein performed at the responder STA 103. For instance, an operation of the method 800 may include reception of a message by the responder STA 103 while an operation of the method 400 may include transmission of the same message or similar message by the initiator STA 103.

In addition, discussion herein of various techniques and concepts may be applicable to the method 800 in some cases, including data services, NAN data links, ranging operations, ranging procedures, range configuration parameters, range measurements, fine timing measurements, geofences, messages related to establishment of data services, publish messages, synchronization of NAN devices, reference timing and/or others. In addition, some or all aspects of the examples shown in FIGS. 5-7 may be applicable in some cases.

At operation 805, the responder STA 103 may determine a reference timing for a NAN communication. In some embodiments, previously described techniques, such as those described related to operation 405 of the method 400, may be used, although embodiments are not limited as such. At operation 810, the responder STA 103 may receive a publish message for a data service from an initiator STA 103. In some embodiments, the publish message may indicate that the initiator STA 103 supports the data service. In addition, when a ranging procedure is to be used for the data service, the publish message may include information for the ranging procedure, including but not limited to RCPs such as those described earlier. At operation 815, the responder STA 103 may receive a data request message from the initiator STA 103 for a data service that is to be established between the initiator STA 103 and a responder STA 103. In some embodiments, when a ranging procedure is to be used for the data service, the data request message may include information for the ranging procedure, including but not limited to RCPs such as those described earlier. At operation 820, the initiator STA 103 may determine whether a ranging procedure is to be used for the data service. As an example, the data request message and/or publish message may include a ranging flag that may indicate whether the ranging procedure is to be used. At operation 825, the responder STA 103 may exchange one or more messages related to ranging, such as a ranging response message and/or other message. It should be noted that the initiator STA 103 and/or the responder STA 103 may determine fine timing measurements and/or ranging measurements, in some embodiments. At operation 830, the responder STA 103 and the initiator STA 103 may exchange one or more data packets as part of the data service. As previously described, traffic types of the data packets may be related to range measurements that may be determined in accordance with the ranging procedure.

In Example 1, an apparatus for a station (STA) configurable to operate as an initiator STA may comprise memory. The apparatus may further comprise processing circuitry. The processing circuitry may be configured to determine, for a data service that is to be established between the initiator STA and a responder STA on a Neighbor Awareness Networking (NAN) data link, whether a ranging procedure is to be performed for the data service to measure a range between the STAs. The processing circuitry may be further configured to generate, for transmission to the responder STA, a data request message that indicates a request for an establishment of the data service. When it is determined that the ranging procedure is to be performed for the data service, the data request message may include a group of one or more ranging configuration parameters to be used for the ranging procedure.

In Example 2, the subject matter of Example 1, wherein when it is determined that the ranging procedure is not to be performed for the data service, the data request message may exclude the group of ranging configuration parameters.

In Example 3, the subject matter of one or any combination of Examples 1-2, wherein the group of ranging parameters may include a ranging resolution or a ranging interval that indicates a maximum time difference between two measurements of the range.

In Example 4, the subject matter of one or any combination of Examples 1-3, wherein the group of ranging parameters may include an inner geo-fence threshold and an outer geo-fence threshold. A traffic type of data sent as part of the data service may be based at least partly on a comparison of a range measurement of the ranging procedure with the inner and outer geo-fence thresholds.

In Example 5, the subject matter of one or any combination of Examples 1-4, wherein the processing circuitry may be further configured to determine a range measurement between the STAs. The processing circuitry may be further configured to generate a group of data packets for transmission to the responding STA as part of the data service. A traffic type of the group of data packets may be based at least partly on the range measurement.

In Example 6, the subject matter of one or any combination of Examples 1-5, wherein the group of data packets may be of a first traffic type when the range measurement is less than a range threshold, the group of data packets may be of a second traffic type when the range measurement is greater than the range threshold, and a first data rate for the first traffic type may be higher than a second data rate for the second traffic type.

In Example 7, the subject matter of one or any combination of Examples 1-6, wherein the data service may be a second data service and the ranging procedure may be a second ranging procedure. The processing circuitry may be further configured to determine whether the second data service may use a first ranging procedure established for a first data service between the STAs on the NAN data link. The determination of whether the second ranging procedure is to be established for the second data service may be based at least partly on whether the second data service may use the first ranging procedure.

In Example 8, the subject matter of one or any combination of Examples 1-7, wherein the processing circuitry may be further configured to, when it is determined that the second data service may use the first ranging procedure, determine a range measurement in accordance with the first ranging procedure and determine, based at least partly on the range measurement, a traffic type of data to be sent to the responder STA as part of the second data service.

In Example 9, the subject matter of one or any combination of Examples 1-8, wherein the processing circuitry may be further configured to determine a fine timing measurement based on a reception of a ranging response message from the responder STA. The processing circuitry may be further configured to determine a range measurement between the STAs based at least partly on the fine timing measurement.

In Example 10, the subject matter of one or any combination of Examples 1-9, wherein the processing circuitry may be further configured to generate, for a broadcast transmission to other STAs, a publish message that indicates that the data service is supported by the initiator STA. The publish message may include the group of one or more ranging configuration parameters when the data service is to be used in accordance with the ranging procedure.

In Example 11, the subject matter of one or any combination of Examples 1-10, wherein the processing circuitry may be further configured to, when it is determined that the ranging procedure is to be performed for the data service, refrain from sending a ranging request message separate from the data request message.

In Example 12, the subject matter of one or any combination of Examples 1-11, wherein the NAN data link may include a direct wireless link between the initiator STA and the responder STA.

In Example 13, the subject matter of one or any combination of Examples 1-12, wherein the processing circuitry may be further configured to determine, based at least partly on a synchronization signal received from another STA, a reference timing for the NAN data link. The data request message may be transmitted in accordance with the reference timing.

In Example 14, the subject matter of one or any combination of Examples 1-13, wherein the processing circuitry may include a baseband processor to determine and to generate the data request message.

In Example 15, the subject matter of one or any combination of Examples 1-14, wherein the apparatus may further include a transceiver to transmit the data request message.

In Example 16, a non-transitory computer-readable storage medium may store instructions for execution by one or more processors to perform operations for ranging by a station (STA) configurable to operate as an initiator STA. The operations may configure the one or more processors to generate, for transmission to a first responder STA, a first data request message that indicates a request to establish a first data service. The operations may further configure the one or more processors to generate, for transmission to a second responder STA, a second data request message that indicates a request to establish a second data service. The first data service may include usage of a ranging procedure and the first data request message may include a group of one or more ranging configuration parameters to be used by the initiator STA and the first responder STA for the ranging procedure. The second data service may exclude usage of the ranging procedure and the second data request message may exclude the group of ranging configuration parameters.

In Example 17, the subject matter of Example 16, wherein the first data service is to be established between the initiator STA and the first responder STA on a first Neighbor Awareness Networking (NAN) data link, the second data service is to be established between the initiator STA and the second responder STA on a second NAN data link, and the ranging procedure to be used by the first data service may include measurements of a range between the initiator STA and the first responder STA.

In Example 18, the subject matter of one or any combination of Examples 16-17, wherein the operations may further configure the one or more processors to determine, based at least partly on a synchronization signal received from another STA, a reference timing for the NAN data links. The data request messages may be transmitted in accordance with the reference timing.

In Example 19, the subject matter of one or any combination of Examples 16-18, wherein the group of ranging parameters may include a ranging resolution or a ranging interval that indicates a maximum time difference between two measurements of the range.

In Example 20, the subject matter of one or any combination of Examples 16-19, wherein the group of ranging parameters may include an inner geo-fence threshold and an outer geo-fence threshold. A traffic type of data sent as part of the first data service may be based at least partly on a comparison of a range measurement of the ranging procedure with the inner and outer geo-fence thresholds.

In Example 21, the subject matter of one or any combination of Examples 16-20, wherein the operations may further configure the one or more processors to determine a fine timing measurement based on a reception of a ranging response message from the first responder STA. The operations may further configure the one or more processors to determine a range measurement between the initiator STA and the first responder STA based at least partly on the fine timing measurement.

In Example 22, the subject matter of one or any combination of Examples 16-21, wherein the operations may further configure the one or more processors to generate, for a broadcast transmission to other STAs, a publish message that indicates that the first data service is supported by the initiator STA and includes the group of one or more ranging configuration parameters.

In Example 23, the subject matter of one or any combination of Examples 16-22, wherein the operations may further configure the one or more processors to refrain from sending a ranging request message separate from the first data request message.

In Example 24, a method of communication by a station (STA) configurable to operate as an initiator STA may comprise determining, for a data service that is to be established between the initiator STA and a responder STA on a Neighbor Awareness Networking (NAN) data link, whether a ranging procedure is to be performed for the data service to measure a range between the STAs. The method may further comprise generating, for transmission to the responder STA, a data request message that indicates a request for an establishment of the data service. When it is determined that the ranging procedure is to be performed for the data service, the data request message may include a group of one or more ranging configuration parameters to be used for the ranging procedure.

In Example 25, the subject matter of Example 24, wherein when it is determined that the ranging procedure is not to be performed for the data service, the data request message may exclude the group of ranging configuration parameters.

In Example 26, the subject matter of one or any combination of Examples 24-25, wherein the group of ranging parameters may include a ranging resolution, a ranging interval that indicates a maximum time difference between two measurements of the range or a set of geo-fence thresholds.

In Example 27, an apparatus for a station (STA) configurable to operate as a responder STA may comprise memory. The apparatus may further comprise processing circuitry. The processing circuitry may be configured to decode a data request message from an initiator STA that indicates a request for an establishment of a data service between the initiator STA and the responder STA on a Neighbor Awareness Networking (NAN) data link. The processing circuitry may be further configured to determine, based at least partly on the decoded data request message, whether a ranging procedure is to be performed for the data service to measure a range between the STAs. The processing circuitry may be further configured to, when it is determined that the ranging procedure is to be performed for the data service, generate for transmission to the initiator STA, a range response message in accordance with a group of one or more ranging configuration parameters included in the data request message.

In Example 28, the subject matter of Example 27, wherein the group of ranging parameters may include a ranging resolution, a ranging interval that indicates a maximum time difference between two measurements of the range, an inner geo-fence threshold or an outer geo-fence threshold.

In Example 29, the subject matter of one or any combination of Examples 27-28, wherein the processing circuitry may be further configured to determine, based at least partly on a synchronization signal received from another STA, a reference timing for the NAN data link. The data request message may be received in accordance with the reference timing.

In Example 30, the subject matter of one or any combination of Examples 27-29, wherein the processing circuitry may include a baseband processor to decode the data request message and to generate the range response message.

In Example 31, the subject matter of one or any combination of Examples 27-30, wherein the apparatus may further include a transceiver to receive the data request message and to transmit the range response message.

In Example 32, an apparatus for a station (STA) configurable to operate as an initiator STA may comprise means for determining, for a data service that is to be established between the initiator STA and a responder STA on a Neighbor Awareness Networking (NAN) data link, whether a ranging procedure is to be performed for the data service to measure a range between the STAs. The apparatus may further comprise means for generating, for transmission to the responder STA, a data request message that indicates a request for an establishment of the data service. When it is determined that the ranging procedure is to be performed for the data service, the data request message may include a group of one or more ranging configuration parameters to be used for the ranging procedure.

In Example 33, the subject matter of Example 32, wherein when it is determined that the ranging procedure is not to be performed for the data service, the data request message excludes the group of ranging configuration parameters.

In Example 34, the subject matter of one or any combination of Examples 32-33, wherein the group of ranging parameters may include a ranging resolution, a ranging interval that indicates a maximum time difference between two measurements of the range, an inner geo-fence threshold or an outer geo-fence threshold.

In Example 35, an apparatus for a station (STA) configurable to operate as a responder STA may comprise means for decoding a data request message from an initiator STA that indicates a request for an establishment of a data service between the initiator STA and the responder STA on a Neighbor Awareness Networking (NAN) data link. The apparatus may further comprise means for determining, based at least partly on the decoded data request message, whether a ranging procedure is to be performed for the data service to measure a range between the STAs. The apparatus may further comprise means for generating for transmission to the initiator STA, when it is determined that the ranging procedure is to be performed for the data service, a range response message in accordance with a group of one or more ranging configuration parameters included in the data request message.

In Example 36, the subject matter of Example 35, wherein the group of ranging parameters may include a ranging resolution, a ranging interval that indicates a maximum time difference between two measurements of the range, an inner geo-fence threshold or an outer geo-fence threshold.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a station (STA) configurable to operate as an initiator STA, the apparatus comprising:
   memory; and processing circuitry configured to:
   determine, for a data service that is to be established between the initiator STA and a responder STA on a Neighbor Awareness Networking (NAN) data link, whether a ranging procedure is to be performed for the data service to measure a range between the initiator STA and the responder STA; and
   generate, for transmission to the responder STA, a data request message that indicates a request for an establishment of the data service,
   wherein when it is determined that the ranging procedure is to be performed for the data service, the data request message includes a group of ranging configuration parameters to be used for the ranging procedure, the group of ranging configuration parameters including an inner geo-fence threshold and an outer geo-fence threshold, and
   wherein a traffic type of data sent as part of the data service is based at least partly on a comparison of a range measurement of the ranging procedure with the inner and outer geo-fence thresholds.

2. The apparatus according to claim 1, wherein when it is determined that the ranging procedure is not to be performed for the data service, the data request message excludes the group of ranging configuration parameters.

3. The apparatus according to claim 1, wherein the group of ranging configuration parameters includes a ranging resolution or a ranging interval that indicates a maximum time difference between two measurements of the range.

4. The apparatus according to claim 1, the processing circuitry further configured to:
   determine a range measurement between the initiator STA and the responder STA; and
   generate a group of data packets for transmission to the responding STA as part of the data service,
   wherein a traffic type of the group of data packets is based at least partly on the range measurement.

5. The apparatus according to claim 4, wherein:
   the group of data packets are of a first traffic type when the range measurement is less than a range threshold,
   the group of data packets are of a second traffic type when the range measurement is greater than the range threshold, and
   a first data rate for the first traffic type is higher than a second data rate for the second traffic type.

6. The apparatus according to claim 1, wherein:
   the data service is a second data service and the ranging procedure is a second ranging procedure,
   the processing circuitry is further configured to determine whether the second data service may use a first ranging procedure established for a first data service between the initiator STA and the responder STA on the NAN data link, and
   the determination of whether the second ranging procedure is to be established for the second data service is based at least partly on whether the second data service may use the first ranging procedure.

7. The apparatus according to claim 6, the processing circuitry further configured to:
   when it is determined that the second data service may use the first ranging procedure:
   determine a range measurement in accordance with the first ranging procedure; and
   determine, based at least partly on the range measurement, a traffic type of data to be sent to the responder STA as part of the second data service.

8. The apparatus according to claim 1, the processing circuitry further configured to:
   determine a fine timing measurement based on a reception of a ranging response message from the responder STA; and
   determine a range measurement between the initiator STA and the responder STA based at least partly on the fine timing measurement.

9. The apparatus according to claim 1, the processing circuitry further configured to:
   generate, for a broadcast transmission to an additional STA, a publish message that indicates that the data service is supported by the initiator STA,
   wherein the publish message includes the group of ranging configuration parameters when the data service is to be used in accordance with the ranging procedure.

10. The apparatus according to claim 1, the processing circuitry further configured to, when it is determined that the ranging procedure is to be performed for the data service, refrain from sending a ranging request message separate from the data request message.

11. The apparatus according to claim 1, wherein the NAN data link includes a direct wireless link between the initiator STA and the responder STA.

12. The apparatus according to claim 1, the processing circuitry further configured to:

determine, based at least partly on a synchronization signal received from another STA, a reference timing for the NAN data link, wherein the data request message is transmitted in accordance with the reference timing.

13. The apparatus according to claim 1, wherein the processing circuitry includes a baseband processor to determine and to generate the data request message.

14. The apparatus according to claim 1, wherein the apparatus further includes a transceiver to transmit the data request message.

15. A non-transitory computer-readable storage medium that stores instructions for execution by one or more processors to perform operations for ranging by a station (STA) configurable to operate as an initiator STA, the operations to configure the one or more processors to:

generate, for transmission to a first responder STA, a first data request message that indicates a request to establish a first data service; and generate, for transmission to a second responder STA, a second data request message that indicates a request to establish a second data service, wherein the first data service includes usage of a ranging procedure and the first data request message includes a group of ranging configuration parameters to be used by the initiator STA and the first responder STA for the ranging procedure, and wherein the second data service excludes usage of the ranging procedure and the second data request message excludes the group of ranging configuration parameters.

16. The non-transitory computer-readable storage medium according to claim 15, wherein:

the first data service is to be established between the initiator STA and the first responder STA on a first Neighbor Awareness Networking (NAN) data link, the second data service is to be established between the initiator STA and the second responder STA on a second NAN data link, the ranging procedure to be used by the first data service includes measurements of a range between the initiator STA and the first responder STA.

17. The non-transitory computer-readable storage medium according to claim 16, the operations to further configure the one or more processors to:

determine, based at least partly on a synchronization signal received from another STA, a reference timing for the NAN data links, wherein the data request messages are transmitted in accordance with the reference timing.

18. The non-transitory computer-readable storage medium according to claim 15, wherein the group of ranging configuration parameters includes a ranging resolution or a ranging interval that indicates a maximum time difference between two measurements of the range.

19. The non-transitory computer-readable storage medium according to claim 15, wherein:

the group of ranging configuration parameters includes an inner geo-fence threshold and an outer geo-fence threshold, and a traffic type of data sent as part of the first data service is based at least partly on a comparison of a range measurement of the ranging procedure with the inner and outer geo-fence thresholds.

20. The non-transitory computer-readable storage medium according to claim 15, the operations to further configure the one or more processors to:

determine a fine timing measurement based on a reception of a ranging response message from the first responder STA; and determine a range measurement between the initiator STA and the first responder STA based at least partly on the fine timing measurement.

21. The non-transitory computer-readable storage medium according to claim 15, the operations to further configure the one or more processors to generate, for a broadcast transmission to an additional STA a publish message that indicates that the first data service is supported by the initiator STA and includes the group of ranging configuration parameters.

22. The non-transitory computer-readable storage medium according to claim 15, the operations to further configure the one or more processors to refrain from sending a ranging request message separate from the first data request message.

23. A method of communication performed by an apparatus of a station (STA), the apparatus comprising processing circuitry, and memory, the processing circuitry to configure the STA to operate as an initiator STA, the method comprising:

determining by the processing circuitry, for a data service that is to be established between the initiator STA and a responder STA on a Neighbor Awareness Networking (NAN) data link, whether a ranging procedure is to be performed for the data service to measure a range between the initiator STA and the responder STA; and generating for transmission to the responder STA, a data request message that indicates a request for an establishment of the data service, wherein when it is determined that the ranging procedure is to be performed for the data service, the data request message includes a group of ranging configuration parameters to be used for the ranging procedure, the group of ranging configuration parameters including set of geo-fence thresholds, and wherein a traffic type of data sent as part of the data service is based at least partly on a comparison of a range measurement of the ranging procedure with the set of geo-fence thresholds.

24. The method according to claim 23, wherein when it is determined that the ranging procedure is not to be performed for the data service, the data request message excludes the group of ranging configuration parameters.

25. The method according to claim 23, wherein the group of ranging configuration parameters includes a ranging resolution, a ranging interval that indicates a maximum time difference between two measurements of the range or the set of geo-fence thresholds.

26. An apparatus for a station (STA) configurable to operate as a responder STA, the apparatus comprising:

memory; and processing circuitry configured to:

decode a data request message from an initiator STA that indicates a request for an establishment of a data service between the initiator STA and the responder STA on a Neighbor Awareness Networking (NAN) data link:

determine, based at least partly on the decoded data request message, whether a ranging procedure is to be performed for the data service to measure a range between the initiator STA and the responder STA; and when it is determined that the ranging procedure is to be performed for the data service, generate for transmission to the initiator STA, a range response message in accordance with a group of ranging configuration parameters included in the data request message, the group of ranging configuration parameters including an inner geo-fence threshold and an outer geo-fence threshold, and wherein a traffic type of data sent as part of the data service is based at least partly on a comparison of a range measurement of the ranging procedure with the inner and outer geo-fence thresholds.

27. The apparatus according to claim 26, wherein the group of ranging configuration parameters includes a ranging resolution, a ranging interval that indicates a maximum time difference between two measurements of the range.

28. The apparatus according to claim 26, the processing circuitry further configured to:

determine, based at least partly on a synchronization signal received from another STA, a reference timing for the NAN data link, wherein the data request message is received in accordance with the reference timing.

29. The apparatus according to claim 26, wherein the processing circuitry includes a baseband processor to decode the data request message and to generate the range response message.

30. The apparatus according to claim 26, wherein the apparatus further includes a transceiver to receive the data request message and to transmit the range response message.

* * * * *

UNITED STATES PATENT AND TRADEMARK OFFICE
CERTIFICATE OF CORRECTION

PATENT NO. : 10,117,161 B2  
APPLICATION NO. : 15/168871  
DATED : October 30, 2018  
INVENTOR(S) : Qi et al.

Page 1 of 1

It is certified that error appears in the above-identified patent and that said Letters Patent is hereby corrected as shown below:

On the Title Page

On page 2, in Column 1, under "Other Publications", Line 5, delete "NeighborAwareness" and insert --Neighbor Awareness-- therefor On page 2, in Column 1, under "Other Publications", Line 7, delete "alwayson" and insert --always on-- therefor In the Claims In Column 26, Line 10, in Claim 21, after "STA", insert --,--

In Column 26, Line 59, in Claim 26, delete "link:" and insert --link;-- therefor Signed and Sealed this  
Twelfth Day of January, 2021

Andrei Iancu  
*Director of the United States Patent and Trademark Office*